United States Patent [19]
Kato et al.

[11] Patent Number: 6,117,936
[45] Date of Patent: Sep. 12, 2000

[54] EMULSIFIED POLYMER AND METHOD

[75] Inventors: Akiko Kato; Shigeo Nishiguchi; Reijirou Nishida; Masami Sugishima; Nobuhita Hirata, all of Hiratsuka, Japan

[73] Assignee: Kansai Paint Co., Ltd., Japan

[21] Appl. No.: 09/048,031

[22] Filed: Mar. 26, 1998

[30] Foreign Application Priority Data

Mar. 27, 1997 [JP] Japan ................................. 9-113284
Aug. 1, 1997 [JP] Japan ................................. 9-238800

[51] Int. Cl.$^7$ ................. C08J 3/00; C08K 3/20; C08L 75/00; C08F 8/30; C08F 283/04
[52] U.S. Cl. .................. 524/591; 524/507; 524/839; 524/840; 525/123; 525/455
[58] Field of Search .................... 524/507, 591, 524/839, 840; 525/123, 455

[56] References Cited

U.S. PATENT DOCUMENTS

| 5,539,018 | 7/1996 | Luhmann et al. ............... 523/201 |
| 5,623,016 | 4/1997 | Klein et al. ..................... 524/591 |

FOREIGN PATENT DOCUMENTS

| 0648 794 | 4/1995 | European Pat. Off. . |
| 8-003019 | 1/1996 | Japan . |

*Primary Examiner*—Patrick D. Niland
*Attorney, Agent, or Firm*—Rader, Fishman & Grauer

[57] ABSTRACT

An aqueous emulsified polymer dispersion comprising emulsion particles having a multilayer construction, wherein at least one of the multiple layers of the construction forms a urethane graft copolymer layer from an unsaturated polyurethane.

15 Claims, No Drawings

EMULSIFIED POLYMER AND METHOD

BACKGROUND OF THE INVENTION

1. Field of the Invention

The present invention generally relates to an emulsified polymer containing an aqueous polyurethane component and having a high solids content, a method for production of emulsified polymers, and a water-based paint grade resin composition using emulsified polymers as an applied film-forming component.

2. Description of Related Art

In the field of coating materials, inks, adhesive agents, etc., the conversion of products using organic solvents to those using water as a vehicle (water-based products) is being promoted with a view to conserving natural resources, securing environmental hygiene, protecting the environment against pollution, ensuring detoxification of dangerous substances, and so on. Generally, air driable water-based paints use an acryl type copolymer emulsion as a component of the vehicle. The emulsion, though capable of allowing production of an applied film excelling in weatherability and rigidity, reveals deficiency, inter alia, in resistance to water and resistance to pollution. Meanwhile, the market is experiencing an increased need for improving the elasticity and toughness of applied films. The feasibility of using a urethane resin in air drying water-based paints is being studied.

A cold-setting type water paint comprising a carbonyl group-containing aqueous polyurethane resin and a hydrazide compound has been proposed, for example, in Japanese Examined Patent Publication No. 8-3,019 as a water-based paint including urethane. Though this paint can form an applied film excellent in resistance to water, etc., it has a low solids content, and the solids content of the aqueous polyurethane resin is only increased with difficulty. When it is used as a coating material, it has the problem of inferior workability in coating as evidenced by its tendency to sag. Further, the known technique of grafting a urethane and an acrylic monomer does not significantly heighten the solids content because the grafting imposes a limit on the monomer composition and the ratio of urethane to acrylic monomer.

SUMMARY OF THE INVENTION

The present inventors, after a diligent study continued with a view, inter alia, to solving one or more problems mentioned above, have found that when a specific unsaturated polyurethane resin is used as a component of the emulsifier during one of the multiple stages of emulsion polymerization, the water dispersion of the produced emulsified polymer heightens the solids content thereof. In addition, a water-based paint having the emulsified polymer as an applied film-forming component, when applied to a surface, avoids sagging during the course of the application and forms an applied film which retains both the low-temperature physical properties of a urethane resin as well as the weatherability and rigidity of an acrylic resin.

In accordance with the present invention, there is provided, an aqueous emulsified polymer dispersion comprising emulsion particles having a multilayer construction, wherein at least one of the multiple layers of the construction forms a urethane graft copolymer layer.

In yet further accordance with these and other objectives, there is also provided emulsion polymers and methods for the production of an emulsion polymer comprising a multiple stage emulsion polymerization employing a polymerizable unsaturated monomer in the presence of water and an emulsifier, wherein at least one of the multiple stages employs an unsaturated polyurethane resin obtained by the reaction of (a) a diisocyanate compound, (b) a polyol, (c) a carboxyl group-containing diol, and (d) a hydroxyl group-containing ethylenically unsaturated monomer.

In still yet further accordance with the present invention, there is provided water-based paint resin compositions.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF A PREFERRED EMBODIMENT

The solid content of an urethane emulsion is generally about 35% by weight as compared to that of an acrylic emulsion which is normally used in the construction-use paints (about 50% by weight). The present invention can achieve an emulsion with a solid-content of 40% by weight or higher despite the use of urethane. Thus, as used herein, the term "high-solid-content" refers to a solid content higher than the solid content of comparable urethane emulsions.

Any desired unsaturated polyurethane can be used in the present invention. A suitable unsaturated polyurethane resin to be used in the present invention is preferably a resin which is obtained by the reaction of (a) a diisocyanate compound with (b) a polyol, (c) a carboxyl group containing diol, and (d) a hydroxyl group-containing ethylenically unsaturated monomer. In the production of the emulsified polymer of this invention, this resin may be incorporated in the emulsion polymerization system and generally intended to function as a macromolecular emulsifier during at least one of the multiple stages of the emulsion polymerization.

As concrete examples of the diisocyanate compound (a) which is advantageously used herein, 2,4-tolylene diisocyanate, 2,6-tolylene diisocyanate, 4,4'-diphenyl methane diisocyanate, m-phenylene diisocyanate, xylene diisocyanate, tetramethylene diisocyanate, 2,2,4-trimethylhexane diisocyanate, hexamethylene diisocyanate, lysine diisocyanate, 1,4-cyclohexylene diisocyanate, 4,4'-dicyclohexyl methane diisocyanate, 3,3'-dimethyl4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, and isophorone diisocyanate may be cited, for example. Among other diisocyanate compounds cited above, such aliphatic diisocyanates as tetramethylene diisocyanate, 2,2,4-trimethylhexane diisocyanate, hexamethylene diisocyanate, and lysine diisocyanate and such alicyclic diisocyanates as 1,4-cyclohexylene diisocyanate, 4,4'-dicyclohexyl methane diisocyanate and isophorone diisocyanate prove to be particularly advantageous.

Any polyol can be used to form the polyurethane of the present invention. These polyols may be used singly or in any combination. It is permissible to use a polyester polyol or a high molecular glycol in combination with a low molecular glycol. Preferably, the number average molecular weight of the polyol (b) is in the range of 62–10,000. If the number average molecular weight is smaller than about 62, the urethane may cease to retain the soft moiety thereof. If it exceeds 10,000, the synthesis in process may be disadvantageously be difficult to handle.

Suitable low molecular weight glycols include ethylene glycol, diethylene glycol, triethylene glycol, 1,2-propylene glycol, 1,3-butylene glycol, tetramethylene glycol, hexamethylene glycol, decamethylene glycol, octane diol, tricyclodecane dimethylol, hydrogenated bisphenol A, cyclohexane dimethanol, bisphenol A polyethylene glycol ether, and bisphenol A polypropylene glycol ether, for example. These low molecular weight glycols may be used either singly or in the form of a mixture of two or more members. Suitable low molecular weight glycols preferably have a number average molecular weight from 62–500.

Suitable high molecular weight glycols effectively usable herein include one or more of polyethyleneglycol, polypropyleneglycol, and polytetramethylene glycol, for example. The polyester polyols effectively usable herein include those resulting from the reaction of a glycol component with a dicarboxylic acid component, for example, and they can be easily produced by known methods. They can be produced, for example, not only by a reaction of esterification but also by a reaction of interesterification. The polyester diols which are obtained by a ring-opening reaction of such cyclic ester compounds as $\epsilon$-caprolactones and the copolycondensed polyesters thereof are also embraced as acceptable high molecular weight glycols. Suitable high molecular weight glycols preferably have a number average molecular weight from about 500–10,000.

Suitable carboxyl group-containing diols (c) effectively usable herein include any known in the art, such as one or more of 2,2-dimethylol propionic acid, 2,2-dimethylol butyric acid, 2,2-dimethylol valeric acid, and the polyester polyols or polyether polyols resulting from the condensation thereof, for example. They may be used in combination with such hydroxycarboxylic acids as 12-hydroxystearic acid, paraoxybenzoic acid, 2,2-dimethyl-3-hydroxypropionic acid, and salicylic acid.

Suitable hydroxyl group-containing ethylenically unsaturated monomers (d) effectively usable herein include any known in the art, such as one or more of $\epsilon$-caprolactone polyadducts of 2-hydroxyethyl (meth)acrylate, hydroxypropyl (meth)acrylate, hydroxybutyl (meth)acrylate, polyethylene glycol-mono(meth)acrylate, polypropylene glycol-mono(meth)acrylate, and $\epsilon$-caprolactone polyadducts of 2-hydroxyethyl (meth)acrylate, the $\beta$-methyl-67-valerolactone polyadducts of 2-hydroxyethyl (meth) acrylate, (meth)acrylates such as glycerol mono(meth) acrylate and glycerol di(meth)-acrylate, allyl compounds such as allyl alcohol, glycerol monoallyl ether, and glycerol diallyl ether, and alkylene (preferably 2–4 carbon atoms) oxide adducts (the number of addition mols of alkylene oxide preferably in the range of 0–30 mols, most preferably in the range of 10–20 mols), for example.

A reaction of synthesis for the unsaturated polyurethane resin mentioned above may optionally be carried out in an organic solvent. Any organic solvent can be used. Preferably, the reaction can be performed in an organic solvent such as dioxane, acetone, methylethyl ketone, methylisobutyl ketone, N-methyl pyrrolidone, or tetrahydrofuran which is inactive to the isocyanate group and has high affinity for water. In synthesizing the unsaturated polyurethane resin mentioned above, a monohydric alcohol may be incorporated, optionally and/or as occasion demands, inter alia, for the purpose of sequestrating an excess isocyanate group, in addition to the components (a), (b), (c), and (d) mentioned above. Though the ratios of use of these components (a), (b), (c), and (d) can be amply varied, they are preferably set such that the equivalent weight ratio of the isocyanate groups and the hydroxyl groups in all the components falls preferably in the range of 1:1–1:3, most preferably in the range of 1:1–1:2.5. If the equivalent weight ratio is smaller than about 1:1, the produced resin may have an isocyanate for the terminal groups thereof and fail to attain desired sequestration. If this ratio exceeds about 1:3, it is possible that the excess hydroxyl group content that survives the reaction will increase to the extent of inducing an unwanted decline of the stability of the emulsion during the production of the emulsion polymer.

The ratio of the component (d) to isocyanate is preferably in the range of 0.01–1, most preferably 0.02–0.8, equivalent weight per equivalent weight of the isocyanate group. If this ratio is smaller than about 0.01, the part of the component destined to form a graft may decrease and the effect of the component in improving the relevant physical properties may be insufficient. If the ratio exceeds about 1, the component (d) may form an excess, which in turn may cause an unwanted decline of the stability of the unsaturated polyurethane resin during storage.

No particular restriction is imposed on the production of the unsaturated polyurethane resin mentioned above. The production may be effected, for example, by using all the components (a), (b), (c), and (d) mentioned above at once in the relevant reaction or, alternately, the production may be accomplished by a multistage reaction method (which may comprise causing the diisocyanate to react with part of the polyol and the carboxyl group-containing diol, thereby synthesizing a prepolymer at the isocyanate terminal, and then causing the remainder of the polyol to react with the hydroxyl group-containing ethylenically unsaturated monomer). The reaction may be carried out at a temperature preferably in the range of 40–18° C., most preferably in the range of 60–130° C.

For the purpose of promoting this reaction, one or more amine type catalysts such as triethyl amine, N-ethyl morpholine, or triethylene diamine and/or one or more tin type catalysts such as dibutyl tin dilaurate or dioctyl tin dilaurate which is accepted for the standard reaction of urethanation, may be used. For the purpose of preventing the ethylenically unsaturated compound from being polymerized during the course of the reaction of urethanation, hydroquinone, hydroquinone monomethyl ether, or p-benzoquinone may optionally be used.

An unsaturated polyurethane resin which is produced as described above is preferred to have an acid number in the range of 10–200 per g of the solids content of the resin. Any deviation of the acid number from this range may hinder the conversion of the resin into an aqueous solution or the dispersion of the resin in water and/or sacrifice the water resistance of a resultant applied film.

An unsaturated polyurethane resin of the present invention is preferably dispersed in water. This dispersion in water has no particular restriction to impose but may be effected, for example, by any of the methods known to the art. For example, the dispersion may be implemented by preparing water, optionally a neutralizing agent and a surfactant, The water is kept stirred, and the unsaturated polyurethane resin is added to the stirred water. Alternatively, these components may be continuously mixed altogether from the beginning. A neutralizing agent may optionally be used. The neutralizing agent imposes no restriction, but generally should be capable of neutralizing carboxyl groups. The neutralizing agents effectively usable herein include one or more of sodium hydroxide, potassium hydroxide, trimethyl amine, dimethyl amino ethanol, 2-methyl-2-amino propanol, triethyl amine, and ammonium, for example. The neutralizing agent may optionally be added in advance to the resin to neutralize the carboxyl group. As another alternative, the neutralizing agent may be added in advance to the water intended as the dispersion medium so as to induce neutralization simultaneously with dispersion. As yet another alternative, the neutralizing agent may also be incorporated in the preemulsified polymer at the same time that the unsaturated polyurethane resin is used during the production of the emulsified polymer, which will be specifically described herein below, to effect neutralization of the polymer. If employed, the amount of neutralizing agent to be advantageously used is such that the ratio thereof preferably falls in the range of 0.5–2.0, most preferably 0.7–1.3, equivalent weights per equivalent weight of carboxyl group.

A method in accordance with the present invention comprises subjecting a polymerizing unsaturated monomer to multistage emulsion polymerization in the presence of water and an emulsifier; and performing the emulsion polymerization during at least one of the multiple stages by using the unsaturated polyurethane resin obtained as described above as a macromolecular emulsifier. To be specific, the multistage emulsion polymerization is effected, for example, by a procedure which comprises first subjecting a monomer mixture destined to form an internal layer component to the first stage of emulsion polymerization using a polymerization initiator in the presence of an emulsifier thereby obtaining an aqueous polymer dispersion; and then subjecting a monomer mixture destined to form an external layer component to the second and following stages of emulsion polymerization sequentially in the aqueous dispersion similarly by using an emulsifier and a polymerization initiator. This procedure produces an aqueous dispersion of emulsified polymer particles generally having a multilayer construction.

The polymerizing unsaturated monomer mentioned above is not specifically limited. Any polymerizable unsaturated monomer or monomers known in the art may be used. Concrete examples of the polymerizing unsaturated monomer which is effectively used herein include one or more of alkyl or cycloalkyl esters of 1–24 carbon atoms of (meth) acrylic acid such as methyl (meth)acrylate, ethyl (meth) acrylate, propyl (meth)acrylate, butyl (meth)acrylate, 2-ethylhexyl (meth)acrylate, cyclohexyl (meth)acrylate, lauryl (meth)acrylate, and isobornyl (meth)acrylate; hydroxyalkyl esters of 2–8 carbon atoms of (meth)acrylic acid such as 2-hydroxyethyl (meth)acrylate and hydroxypropyl (meth) acrylate; vinyl aromatic compounds such as styrene and vinyl toluene; (meth)acrylic acid, maleic acid, crotonic acid, P-carboxyethyl acrylate, 2-acrylamide-2-methyl propane sulfonic acid, allyl sulfonic acid, sodium styrene sulfonate, sulfoethyl methacrylate, and sodium salts and ammonium salts thereof; adducts of (meth)acryl amide, dimethyl aminopropyl (meth)acryl amide, dimethyl aminoethyl (meth) acrylate, and glycidyl (meth)acrylate with amines; polyethylene glycol (meth)acrylate, diacetone acryl amide, and diacetone methacryl amide; and N-vinyl pyrrolidone, ethylene, butadiene, chloroprene, vinyl propionate, vinyl acetate, and (meth)acrylonitrile may be cited. These monomers are suitably selected, depending on the desired attributes thereof. For the application in the air drying water-based paints, the (meth)acrylic type monomers are chiefly used favorably among other monomers cited above. The monomer thus selected is preferred to be at main component, i.e., contained in the monomer mixture at a concentration of preferably not less than 50% by weight.

Concrete examples of the emulsifier mentioned above include one or more of anionic surfactants, nonionic surfactants, etc., and may be cited besides the unsaturated polyurethane resin mentioned above. The emulsion polymerization can be effected, for example, by using a polymerization initiator in the presence of at least one of the emulsifiers cited above.

The polymerization initiator to be effectively used herein can be selected from among those known in the art, including one or more of azo type initiators such as azobisvaleronitrile and peroxides such as ammonium persulfate, potassium persulfate, and t-butyl hydroperoxide. It is also permissible to use a reducing agent such as formaldehyde or sodium sulfoxylate for the purpose of lowering the temperature of polymerization, if necessary or desired.

The present invention preferably permits the unsaturated polyurethane resin mentioned above to be incorporated as a macromolecular emulsifier during any one of the multiple stages of emulsion polymerization. Nevertheless, the resin is preferably incorporated during the last of the multiple stages of emulsion polymerization so that the degree with which the freedom of synthesis is attained. Incorporating an unsaturated polyurethane resin at the final stage of emulsion polymerization assures good synthesis. It is also advantageous in terms of mechanical stability of the resultant emulsion (no fusion under large load).

The unsaturated polyurethane resin mentioned above is preferred to be incorporated in an amount such that the ratio thereof falls in the range of 0.1–50% by weight, preferably 1–50% by weight, based on the total solids content of the emulsified polymer of this invention. If the ratio mentioned above is less than about 0.1% by weight, the characteristics of the urethane may be difficult to obtain. Conversely, if the ratio exceeds about 50% by weight, the emulsion necessary for heightening the solids content may be synthesized with difficulty.

During the emulsion polymerization, the unsaturated polyurethane resin mentioned above is incorporated as a macromolecular emulsifier. During this incorporation, the total amount of the solids of the unsaturated polyurethane resin and the polymerizing unsaturated monomer preferably exceeds about 5% by weight. If this concentration is less than about 5% by weight, the synthesis of the emulsion may be difficult to obtain.

An aqueous dispersion of the emulsified polymer which is produced by the method of this invention as described above is preferably such that the emulsion particles in the dispersion has a multilayer construction and at least one of the multiple layers of the construction forms a urethane graft copolymer layer. Since the method of this invention effects the polymerization by a multistage process, it enjoys the advantage of broadening the width of selection of the components of polymer in accordance with the object to be set for the emulsion particles and enables the emulsion as a whole to acquire a heightened solids content in spite of the inclusion of the urethane component.

This invention also aims to provide a water-based paint grade resin composition which combines (i) an emulsified polymer produced on the condition that the polymerizing unsaturated monomer used in the production of the emulsified polymer preferably contains a carbonyl group-containing unsaturated monomer and the emulsion polymerization during at least one of the multiple stages uses the unsaturated polyurethane resin mentioned above as a macromolecular emulsifier, and (ii) a hydrazine derivative serving as a cross-linking agent and containing at least two hydrazide groups or semicarbazide groups per molecule. Paints of the present invention can be prepared without an acryl component.

For the production of the emulsified polymer (i) mentioned above, the use of the carbonyl group-containing unsaturated monomer during at least one of the multiple stages of the polymerization is highly preferred. Advantageously, the amount of the carbonyl group-containing unsaturated monomer accounts for a ratio in the range of preferably 0.1–30% by weight, most preferably 1–10% by weight, while other polymerizable unsaturated monomers are preferably present at a ratio in the range of 99.9–70% by weight, most preferably 99–90% by weight, based on the total weight of all the monomers used during the multiple stages.

It is advantageous that particularly during the last of the multiple stages of polymerization, the amount of the carbonyl group-containing unsaturated monomer accounts for a ratio preferably in the range of 1–50% by weight, most preferably 3–50% by weight, based on the total weight of all the monomers used during this stage.

The carbonyl group-containing unsaturated monomers which are effectively usable herein include one or more of acrolein, diacetone acryl amide, diacetone methacryl amide, acetoacetoxyethyl methacrylate, formyl styrol, and vinyl alkyl ketones having 4–7 carbon atoms (such as, for example, vinyl methyl ketone, vinyl ethyl ketone, and vinyl butyl ketone), for example. Among other carbonyl group-containing unsaturated monomers mentioned above, diacetone acryl amide and diacetone methacryl amide prove to be especially suitable.

The hydrazine derivative (ii) to be used in this invention preferably contains at least two hydrazide groups or semicarbazide groups per molecule. Concrete examples of the hydrazine derivative (ii) which answers the description given above, include one or more of saturated aliphatic carboxylic dihydrazides, preferably having 2–18 carbon atoms as oxalic dihydrazide, malonic dihydrazide, glutaric dihydrazide, succinic dihydrazide, adipic dihydrazide, and sebacic dihydrazide; monoolefinically unsaturated dicarboxylic dihydrazides such as maleic dihydrazide, fumaric dihydrazide, and itaconic dihydrazide; phthalic, terephthalic, or isophthalic dihydrazide and pyromellitic dihydrazide, trihydrazide, or tetrahydrazide; polyhydrazides resulting from the reaction of nitrilotrihydrazide, citric trihydrazide, 1,2,4-benzene trihydrazide, ethylene diamine tetraacetic tetrahydrazide, 1,4,5,8-naphthoeic tetrahydrazide, and low polymers containing a carboxylic lower alkyl ester group with hydrazine or hydrazine hydrate (as described in JP-B-52-22,878, for example); and carbonic dihydrazide and bis-semicarbazide; polyfunctional semicarbazides obtained by causing a hydrazine compound or any of the dihydrazides cited above to react in an excess amount with such diisocyanates as hexamethylene diisocyanate and isophorone diisocyanate and polyisocyanate compounds derived therefrom, water type polyfunctional semicarbazides such as those that may be obtained by the reaction of any of the dihydrazides cited above in an excess amount with the isocyanate group in the reaction product of the polyisocyanate compound mentioned above with an active hydrogen compound containing a hydrophilic group such as a polyether polyol or polyethylene glycol monoalkyl ether, or mixtures of the polyfunctional semicarbazides with the water type polyfunctional semicarbazides mentioned above (as described, for example, in JP-A-08-151,358 and JP-A-08245,878) may be cited.

The hydrazine derivative (ii) mentioned above is preferably incorporated in an amount such that the hydrazide group or the semicarbazide group in the hydrazine derivative (ii) accounts for a ratio in the range of preferably 0.01–2 mols, most preferably 0.05–1.5 mols, per mol of the carbonyl group contained in the emulsified polymer (i). If the ratio of the hydrazine derivative (ii) mentioned above is less than about 0.01 mol, the cross-linking effect to be produced at all may not be sufficient and the film to be formed may manifest brittleness. If the ratio exceeds about 2 mols, the excess may fail to bring about a desired proportionate addition to the cross-linking effect.

When the emulsified polymer of this invention or the resin composition of this invention is further used for producing a coating material, one or more additives such as cross-linking agent, pigment, filler, aggregate, pigment dispersant, wetting agent, defoaming agent, plasticizer, film-forming auxiliary, organic solvent, antiseptics, fungifuge, pH adjusting agent, rust preventives, and setting catalyst may be suitably selected, combined, and incorporated to suit the purpose for which the coating material is used.

Now, this invention will be described more specifically below with reference to working examples, which illustrate, but do not limit the invention.

Production of Unsaturated Polyurethane Resin

In a four-neck flask, 4 liters in inner volume, 660 g of polycaprolactone diol (produced by Daicel Chemical Industries, Ltd. and marketed under trademark designation of "PLACCEL 205"), 111 g of dimethylol butyric acid and 325 g of texanol isobutyl ether (produced by Kyowa Hakko Kogyo Co., Ltd. and marketed under trademark designation of "KYOWANOL D") were added as stirred and heated meanwhile to 80° C. until they formed a homogeneous mixture. To this mixture, 666 g of isophorone diisocyanate was added dropwise over a period of 30 minutes. After the dropwise addition was completed, the ensuant mixture was continuously kept at 80° C. until the isocyanate number thereof fell below 65. Then, 139 g of 2-hydroxyethyl acrylate was added thereto. The resultant mixture was continuously left standing at 80° C. until the isocyanate number thereof fell below 25 and then followed by the addition of 212 g of ethylene glycol. The mixture was kept continuously at 80° C. until the isocyanate number thereof fell below 5 and then cooled to obtain an unsaturated polyurethane resin solution having a solids content of 77% by weight.

Production of Aqueous Dispersion of Emulsion Polymer

EXAMPLE 1

In a four-neck flask, 5 liters in inner volume, 348 g of deionized water and 0.6 g of an anionic surfactant possessing a polyoxyethylene chain and an involatile content of 30% (produced by Nippon Nyukazai K.K. and marketed under trademark designation of "Newcol 707SF") were placed, the gaseous phase remaining therein was displaced with nitrogen, and the resultant aqueous solution was kept at 85° C. Subsequently, 0.8 g of ammonium persulfate was added to the hot aqueous solution immediately prior to the dropwise addition of a preemulsion of the following composition and then the preemulsion was added dropwise over a period of three hours.

| | |
|---|---|
| Deionized water | 271 g |
| Methyl methacrylate | 300 g |
| Styrene | 105 g |
| n-Butyl acrylate | 180 g |
| 2-Ethylhexyl acrylate | 113 g |
| Diacetone acryl amide | 38 g |
| Hydroxyethyl acrylate | 15 g |

| | |
|---|---|
| Newcol 707SF | 50 g |
| Ammonium persulfate | 1.5 g |

After the elapse of 30 minutes following the completion of the dropwise addition mentioned above, the resultant mixture was cooled to 75° C. After the elapse of subsequent 30 minutes, the preemulsion of the following composition was added dropwise to the mixture over a period of two hours.

| | |
|---|---|
| Unsaturated polyurethane resin solution | 130 g |
| Methyl methacrylate | 75 g |
| n-Butyl acrylate | 67.5 g |
| Diacetone acryl amide | 7.5 g |
| Triethyl amine | 5.1 g |
| Ammonium persulfate | 0.6 g |
| Deionized water | 373 g |

After the elapse of 30 minutes following the completion of the dropwise addition mentioned above, a solution of 0.5 g of ammonium persulfate in 40 g of deionized water was added dropwise to the resultant mixture over a period of 30 minutes. After the completion of this dropwise addition, the mixture was further kept at 75° C. for one hour to obtain an emulsified polymer emulsion having a solids content of 47.1% by weight, viscosity of 17 cP, pH of 6.7, and a particle diameter of 251 nm.

EXAMPLE 2

A emulsified polymer emulsion having a solids content of 47.3% by weight, viscosity of 25 cP, pH of 6.7, and particle diameter of 248 nm was obtained by following the procedure of Example 1 while changing the monomer in the preemulsion added dropwise during each of the stages to the following composition.

| | |
|---|---|
| (First stage) | |
| Deionized water | 271 g |
| Methyl methacrylate | 300 g |
| Styrene | 140 g |
| n-Butyl acrylate | 200 g |
| Acrylic acid | 10 g |
| Hydroxyethyl methacrylate | 100 g |
| Newcol 707SF | 50 g |
| Ammonium persulfate | 1.5 g |
| (Second stage) | |
| Unsaturated polyurethane resin solution | 130 g |
| Methyl methacrylate | 75 g |
| n-Butyl acrylate | 67.5 g |
| Hydroxyethyl methacrylate | 7.5 g |
| Triethyl amine | 5.1 g |
| Ammonium persulfate | 0.6 g |
| Deionized water | 373 g |

EXAMPLE 3

A emulsified polymer emulsion having a solids content of 47.2% by weight, viscosity of 22 cP, pH of 6.9, and particle diameter of 238 nm was obtained by following the procedure of Example 1 while changing the monomer in the preemulsion added dropwise during each of the stages to the following composition.

| | |
|---|---|
| (First stage) | |
| Deionized water | 271 g |
| Methyl methacrylate | 350 g |
| Styrene | 140 g |
| n-Butyl acrylate | 150 g |
| 2-Ethylhexyl acrylate | 50 g |
| Diacetone acryl amide | 10 g |
| Hydroxyethyl acrylate | 50 g |
| Hydroxyethyl methacrylate | 50 g |
| Newcol 707SF | 50 g |
| Ammonium persulfate | 1.5 g |
| (Second stage) | |
| Unsaturated polyurethane resin solution | 130 g |
| Methyl methacrylate | 90 g |
| Hydroxyethyl methacrylate | 10 g |
| Triethyl amine | 5.1 g |
| Ammonium persulfate | 0.6 g |
| Deionized water | 373 g |

EXAMPLE 4

In a four-neck flask, 5 liters in inner volume, 254 g of deionized water and 0.6 g of an anionic surfactant possessing a polyoxyethylene chain and an involatile content of 30% (produced by Nippon Nyukazai K.K. and marketed under trademark designation of "Newcol 707SF") were placed, the gaseous phase remaining therein was displaced with nitrogen, and the resultant aqueous solution was kept at 85° C. Subsequently, 0.6 g of ammonium persulfate was added to the hot aqueous solution immediately prior to the dropwise addition of a preemulsion of the following composition and then the preemulsion was added dropwise over a period of three hours.

| | |
|---|---|
| Deionized water | 181 g |
| Methyl methacrylate | 200 g |
| Styrene | 70 g |
| n-Butyl acrylate | 195 g |
| Diacetone acryl amide | 25 g |
| Hydroxyethyl acrylate | 10 g |
| Newcol 707SF | 35 g |
| Ammonium persulfate | 1.0 g |

After the elapse of 30 minutes following the completion of the dropwise addition mentioned above, the resultant mixture was cooled to 75° C. After the elapse of subsequent 30 minutes, the preemulsion of the following composition was added dropwise to the mixture over a period of two hours.

| | |
|---|---|
| Unsaturated polyurethane resin solution | 130 g |
| Methyl methacrylate | 75 g |
| n-Butyl acrylate | 67.5 g |
| Diacetone acryl amide | 7.5 g |
| Triethyl amine | 5.1 g |
| Ammonium persulfate | 0.6 g |
| Deionized water | 373 g |

After the elapse of 30 minutes following the completion of the dropwise addition mentioned above, a solution of 0.5 g of ammonium persulfate in 30 g of deionized water was added dropwise to the resultant mixture over a period of 30 minutes. After the completion of this dropwise addition, the mixture was further kept at 75° C. for one hour to obtain an emulsified polymer emulsion having a solids content of 45.7% by weight, viscosity of 14 cP, pH of 7.1, and a particle diameter of 238 nm.

EXAMPLE 5

In a four-neck flask, 5 liters in inner volume, 344 g of deionized water and 4.5 g of an anionic surfactant possessing a polyoxyethylene chain and an involatile content of 30% (produced by Nippon Nyukazai K.K. and marketed under trademark designation of "Newcol 707SF") were placed, the gaseous phase remaining therein was displaced with nitrogen, and the resultant aqueous solution was kept at 70° C. Subsequently, 0.3 g of ammonium persulfate was added to the hot aqueous solution immediately prior to the dropwise addition of a preemulsion of the following composition and then the preemulsion was added dropwise over a period of two hours.

| | |
|---|---|
| Unsaturated polyurethane resin solution | 130 g |
| Methyl methacrylate | 75 g |
| n-Butyl acrylate | 67.5 g |
| Diacetone acryl amide | 7.5 g |
| Triethl amine | 5.1 g |
| Ammonium persulfate | 0.6 g |
| Deionized water | 373 g |

After the elapse of 30 minutes following the completion of the dropwise addition mentioned above, the resultant mixture was heated to 75° C. After the elapse of subsequent 30 minutes, the preemulsion of the following composition was added dropwise to the mixture over a period of three hours.

| | |
|---|---|
| Deionized water | 271 g |
| Methyl methacrylate | 300 g |
| Styrene | 105 g |
| n-Butyl acrylate | 180 g |
| 2-Ethylhexyl acrylate | 113 g |
| Diacetone acryl amide | 38 g |
| Hydroxyethyl acrylate | 15 g |
| Newcol 707SF | 50 g |
| Ammonium persulfate | 1.5 g |

After the elapse of 30 minutes following the completion of the dropwise addition mentioned above, a solution of 0.5 g of ammonium persulfate in 40 g of deionized water was added dropwise to the resultant mixture over a period of 30 minutes. After the completion of this dropwise addition, the mixture was further kept at 75° C. for one hour to obtain an emulsified polymer emulsion having a solids content of 47.5% by weight, viscosity of 127 cP, pH of 6.1, and a particle diameter of 118 nm.

Emulsified polymer emulsions (I-1)–(I-4) possessing the properties shown in FIG. 1 were obtained by following the procedure of Example 1 while changing the monomer in the preemulsion added dropwise during each of the stages to the composition shown in Table 1.

TABLE 1

| | | | Example | | | |
|---|---|---|---|---|---|---|
| | | | 6 | 7 | 8 | 9 |
| Name of aqueous emulsified polymer dispersion | | | I-1 | I-2 | I-3 | I-4 |
| Composition | First stage | Methyl methacrylate | 300 | 317 | 233 | 300 |
| | | Styrene | 105 | 111 | 82 | 105 |
| | | n-Butyl acrylate | 180 | 190 | 140 | 292 |
| | | 2-Ethylhexyl acrylate | 112 | 118 | 87 | |
| | | Diacetone acryl amide | 38 | 40 | 30 | 38 |
| | | Hydroxyethyl acrylate | 15 | 16 | 12 | 12 |
| | Second stage | Unsaturated polyurethane resin | 130 | 65 | 390 | 130 |
| | | Methyl methacrylate | 75 | 79 | 58 | 75 |
| | | n-Butyl acrylate | 68 | 71 | 53 | 68 |
| | | Diacetone acryl amide | 7 | 8 | 6 | 7 |
| Urethane/acryl ratio | | | 10/90 | 5/95 | 30/70 | 10/90 |
| Involatile component (% by weight) | | | 47.1 | 47.6 | 45.8 | 47.3 |
| Viscosity (cP) | | | 17 | 19 | 12 | 17 |
| pH | | | 6.7 | 6.9 | 6.4 | 7.1 |
| Particle diameter (nm) | | | 252 | 271 | 233 | 244 |

EXAMPLE 10

In a four-neck flask, 5 liters in inner volume, 344 g of deionized water and 4.5 g of an anionic surfactant possessing a polyoxyethylene chain and an involatile content of 30% (produced by Nippon Nyukazai K.K. and marketed under trademark designation of "Newcol 707SF") were placed, the gaseous phase remaining therein was displaced with nitrogen, and the resultant aqueous solution was kept at 70° C. Subsequently, 0.3 g of ammonium persulfate was added to the hot aqueous solution immediately prior to the dropwise addition of a preemulsion of the following composition and then the preemulsion was added dropwise over a period of two hours.

| | |
|---|---|
| Unsaturated polyurethane resin solution | 130 g |
| Methyl methacrylate | 75 g |
| n-Butyl acrylate | 68 g |
| Diacetone acryl amide | 7.5 g |
| Triethyl amine | 5.1 g |
| Ammonium persulfate | 0.6 g |
| Deionized water | 373 g |

After the elapse of 30 minutes following the completion of the dropwise addition mentioned above, the resultant mixture was heated to 75° C. After the elapse of subsequent 30 minutes, the preemulsion of the following composition was added dropwise to the mixture over a period of three hours.

| | |
|---|---|
| Deionized water | 271 g |
| Methyl methacrylate | 300 g |
| Styrene | 105 g |
| n-Butyl acrylate | 180 g |
| 2-Ethylhexyl acrylate | 112 g |
| Hydroxyethyl acrylate | 15 g |
| Newcol 707SF | 50 g |
| Ammonium persulfate | 1.5 g |

After the elapse of 30 minutes following the completion of the dropwise addition mentioned above, a solution of 0.5 g of ammonium persulfate in 40 g of deionized water was added dropwise to the resultant mixture over a period of 30 minutes. After the completion of this dropwise addition, the mixture was further kept at 75° C. for one hour to obtain an emulsified polymer emulsion (I-5) having a solids content of 47.5-. by weight, viscosity of 127 cP, pH of 6.1, and a particle diameter of 118 nm.

COMPARATIVE EXAMPLE 1

In a four-neck flask, 5 liters in inner volume, 312 g of deionized water and 2.3 g of Newcol 707SF were placed, the gaseous phase remaining therein was displaced with nitrogen, and the resultant aqueous solution was kept at 80° C. Subsequently, 0.7 g of ammonium persulfate was added to the hot aqueous solution and then a preemulsion of the following composition was added dropwise over a period of three hours.

| | |
|---|---|
| Diacetone acryl amide | 74 g |
| Acrylic acid | 3.6 g |
| Styrene | 105 g |
| Methyl methacrylate | 269 g |
| 2-Ethylhexyl acrylate | 105 g |
| n-Butyl acrylate | 176 g |
| Hydroxyethyl acrylate | 15 g |
| Newcol 707SF | 49 g |
| Ammonium persulfate | 1.5 g |
| Deionized water | 315 g |

After the elapse of 30 minutes following the completion of the dropwise addition, a solution of 0.7 g of ammonium persulfate in 7 g of deionized water was added dropwise to the resultant mixture over a period of 30 minutes. After the completion of this dropwise addition, the mixture was continuously left standing at 80° C. for two hours and then cooled to 40–60° C. Then, the mixture was adjusted to pH 8–9 with aqua ammonia to obtain an emulsified polymer emulsion (I-6) having a solids content of 55%. The pH of this emulsion was 8.4.

COMPARATIVE EXAMPLE 2

In a four-neck flask, 5 liters in inner volume, 400 g of deionized water and 20 g of Newcol 707SF were placed, the gaseous phase remaining therein was displaced with nitrogen, and the resultant aqueous solution was kept at 70° C. A preemulsion of the following composition was added dropwise into the aqueous solution over a period of three hours.

| | |
|---|---|
| Unsaturated polyurethane resin solution | 130 g |
| Methyl methacrylate | 375 g |
| n-Butyl acrylate | 247.5 g |
| Diacetone acryl amide | 45.5 g |
| Styrene | 105 g |
| 2-Ethylhexyl acrylate | 113 g |
| Hydroxyethyl acrylate | 15 g |
| Triethyl amine | 5.1 g |
| Ammonium persulfate | 2.5 g |
| Deionized water | 1000 g |

After the elapse of 30 minutes following the completion of the dropwise addition, a solution of 1.25 g of ammonium persulfate in 80 g of deionized water was added dropwise to the resultant mixture over a period of 30 minutes. After the completion of this dropwise addition, the mixture was continuously left standing at 70° C. for one hour to obtain an emulsified polymer emulsion having a solids content of 40.4% by weight. The emulsion copiously contained a filtration residue. The emulsified polymer emulsion (I-7) thus obtained had viscosity of 4.1 cP, pH of 7.2, and a particle diameter of 452 nm.

Formation of Pigment Paste

In a stainless steel vessel, 5 liters in volume, the following composition was placed and stirred with a stirrer for 20–40 minutes to form a pigment paste.

| | |
|---|---|
| Tap water | 960 parts by weight |
| Ethylene glycol | 240 parts by weight |
| Pigment dispersion agent (produced by SANNOPCO K.K. and marketed under trademark designation of "NOPCOSPARTS 44C") | 60 parts by weight |
| Defoaming agent (produced by SANNOPCO K.K. and marketed under trademark designation of "SN Defoamer 364") | 84 parts by weight |
| Thickener (produced by Fuji Chemical K. K. and marketed under trademark designation of "FUJICHEMI HEC KF-100") | 36 parts by weight |
| Titanium white | 2640 parts by weight |

EXAMPLE 11

In a stainless steel vessel, 2 liters in volume, 1000 parts by weight of the emulsified polymer emulsion (I-1) and 6.5 parts by weight of adipic dihydrazide were placed and stirred to obtain a liquid resin mixture (A-1).

Then, in a stainless steel vessel, 1 liter in volume, 201 parts by weight of the pigment paste formed in the formula mentioned above was placed, 475 parts by weight of the liquid resin mixture (A-1) and 18 parts by weight of texanol were added thereto as kept stirred, and the resultant mixture was adjusted to pH 7–9 with aqua ammonia to obtain a coating material (B-1).

EXAMPLE 12–17 AND COMPARATIVE EXAMPLES 3 AND 4

Liquid resin mixtures (A-2)–(A-7) and (A-9) and (A-10) were obtained by following the procedure of Example 11 while having an emulsified polymer emulsion and adipic dihydrazide incorporated as shown in Table 2. Then, coating materials (B-2)–(B-7) and (B-9) and (B-10) were obtained by following the procedure of Example 11 while having pigment pastes and liquid resin mixtures (A-2)–(A-10) and texanol incorporated as shown in Table 3.

EXAMPLE 18

In a stainless steel vessel, 2 liters in volume, 1000 parts by weight of the emulsified polymer emulsion (I-1) and 132 parts by weight of a semicarbazide compound solution (Note 1) were placed and stirred to obtain a liquid resin mixture (A-8).

Then, in a stainless steel vessel, 1 liter in volume, 201 parts by weight of the pigment paste formed in the formula mentioned above was placed, 475 parts by weight of the liquid resin mixture and 18 parts by weight of texanol were added thereto as kept stirred, and the resultant mixture was adjusted to pH 7–9 with aqua ammonia to obtain a coating material (B8).

The physical constants of the coating materials are shown additionally in Table 3.

(Note 1) Semicarbazide compound solution: A semicarbazide group-containing compound (produced by Asahi Chemical Industry Co., Ltd. and marketed under trademark designation of "SX-601"), solids content 45%, butyl cellosolve/water (34/21) solution, NHCO-NHNH2 content 4.8 m.mols/g of resin.

TABLE 2

|  | Example | | | | | | | | Comparative Example | |
|---|---|---|---|---|---|---|---|---|---|---|
|  | 11 | 12 | 13 | 14 | 15 | 16 | 17 | 18 | 3 | 4 |
| Name of liquid resin mixture | A-1 | A-2 | A-3 | A-4 | A-5 | A-6 | A-7 | A-8 | A-9 | A-10 |
| Composition Aqueous emulsified polymer dispersion | | | | | | | | | | |
| I-1 | 1000 | | | 1000 | | | | 1000 | | |
| I-2 | | 1000 | | | | | | | | |
| I-3 | | | 1000 | | | | 500 | | | |
| I-4 | | | | | 1000 | | | | | |
| I-5 | | | | | | 1000 | | | | |
| I-6 | | | | | | | 833 | | 1000 | |
| I-7 | | | | | | | | | | 1000 |
| Adipic dihydrazide | 6.5 | 7.1 | 5.1 | 3.3 | 6.6 | 6.7 | 16.1 | | 16.8 | 5.6 |
| Semicarbazide(Note 1) | | | | | | | | 132 | | |
| Solids content ratio of urethane component/acryl component | 10/90 | 5/95 | 30/70 | 10/90 | 10/90 | 10/90 | 10/90 | 10/90 | — | 10/90 |

TABLE 3

|  | Example | | | | | | | | Comparative Example | |
|---|---|---|---|---|---|---|---|---|---|---|
|  | 11 | 12 | 13 | 14 | 15 | 16 | 17 | 18 | 3 | 4 |
| Name of coating material | B-1 | B-2 | B-3 | B-4 | B-5 | B-6 | B-7 | B-8 | B-9 | B-10 |
| Composition of coating material | | | | | | | | | | |
| Pigment paste | 201 | 201 | 201 | 201 | 201 | 201 | 201 | 201 | 201 | 201 |
| Liquid resin mixture | | | | | | | | | | |
| Kind | A-1 | A-2 | A-3 | A-4 | A-5 | A-6 | A-7 | A-8 | A-9 | A-10 |
| Amount | 451 | 446 | 464 | 452 | 463 | 448 | 411 | 476 | 384 | 525 |
| Texanole | 18 | 18 | 18 | 18 | 18 | 18 | 18 | 18 | 18 | 18 |
| Total amount | 669 | 665 | 683 | 671 | 682 | 667 | 630 | 695 | 602 | 744 |
| physical constant of coating material | | | | | | | | | | |
| Viscosity(25° C., KU value) | 84 | 86 | 80 | 83 | 86 | 88 | 90 | 89 | 94 | 68 |
| pH(20° C.) | 8.1 | 8.1 | 8.0 | 8.0 | 8.2 | 8.1 | 8.2 | 7.9 | 8.1 | 7.9 |
| Solids content | 50 | 50 | 49 | 50 | 50 | 50 | 54 | 4.9 | 63 | 46 |

Coating Test

A plate for coating test was prepared by coating the opposite faces of a bonderized plate, 70×150×0.8 mm, with an epoxy amine type rustproofing undercoating material (produced by Kansai Paint Co., Ltd. and marketed under trademark designation of "ESCO") and allowing the coated plate to stand at rest for 24 hours. A sample of the coating material obtained as described above was diluted with 0–8% of tap water and applied at a rate of 120 g/m² to one face of the plate by means of an air spray. The coated plate was dried for two hours and then it was overcoated with the same coating material at a rate of 120 g/M² by the use of the air spray. The sample plates thus obtained were subjected to the following tests. The results are shown in Table 4.

(1) Test for Resistance to Water (1)

The plate, after being coated, was dried for two hours under the conditions of 20° C. of temperature and 75% of relative humidity, immersed to one half of the length thereof in tap water kept at 20° C., and extracted from the water after one hour's standing therein. The coated face of the plate was visually examined and rated on a four-point scale, wherein ⊚: Absolutely no change ○: Partial blister in the coated face Δ: Blister in the whole coated face ×: Run of coating material from the coated face (2) Test for Resistance to Water (2)

The plate, after being coated, was dried for seven days under the conditions of 20° C. of temperature and 75% of relative humidity, immersed to one half of the Coating Test A plate for coating test was prepared by coating the opposite faces of a bonderized plate, 70×150×0.8 mm, with an epoxy amine type rustproofing undercoating material (produced by Kansai Paint Co., Ltd. and marketed under trademark designation of "ESCO") and allowing the coated plate to stand at rest for 24 hours. A sample of the coating material obtained as described above was diluted with 0–8% of tap water and applied at a rate of 120 g/m² to one face of the plate by means of an air spray. The coated plate was dried for two hours and then it was overcoated with the same coating material at a rate of 120 g/M² by the use of the air spray. The sample plates thus obtained were subjected to the following tests. The results are shown in Table 4.

(1) Test for Resistance to Water (1)

The plate, after being coated, was dried for two hours under the conditions of 20° C. of temperature and 75% of relative humidity, immersed to one half of the length thereof in tap water kept at 20° C., and extracted from the water after one hour's standing therein. The coated face of the plate was visually examined and rated on a four-point scale, wherein ⊚: Absolutely no change ○: Partial blister in the coated face Δ: Blister in the whole coated face ×: Run of coating material from the coated face (2) Test for Resistance to Water (2)

The plate, after being coated, was dried for seven days under the conditions of 20° C. of temperature and 75% of relative humidity, immersed to one half of the length thereof in tap water kept at 20° C., and extracted from the water after five days, standing therein. The coated face of the plate was visually examined and rated on a four-point scale, wherein ⊚: Absolutely no change ○: Partial blister in the coated face Δ: Blister in the whole coated face ×: Run of coating material from the coated face (3) Test for Accelerated Aging by Weather The plate, after being coated, was dried for seven days under the conditions of 20° C. of temperature and 75% of relative humidity and tested for accelerated aging by weather for 1,500 hours by the use of a Sunshine Weather-O-Meter to determine the ratio of gloss retention in accordance with the following formula.

Ratio of gloss retention (%)=(60° gloss after the test)/(60° C. gloss before the test)×100

(4) Test for Tukon Hardness

A glass plate was coated with a sample of the coating material by the use of a 6-mil. blade, dried at room temperature for 10 days, and then tested for Tukon hardness. The Tukon hardness is an index such that the hardness increases in proportion as the numerical value thereof increases.

(5) Test Concerning Waterproof Specifications of JIS A 6910

1) Elongation

A facing grade coating agent (produced by Kansai Paint Co., Ltd. and marketed under trademark designation of "ALES GUMTILE ROUGH") was applied to a plate by drawing a 2-mm blade on the surface thereof. After the elapse of 24 hours thence, a sample of the coating material was applied to the plate with a brush at a rate of loo g/M². After the elapse of subsequent two hours, the plate was overcoated with the same coating material. Thereafter, the coated plate was cured in accordance with the specifications of JIS A 6910 and punched with a dumbbell No. 2. The dumbbell-shaped test piece thus obtained was subjected to an elongation test at 20° C. and −10° C.

2) Alternate Heating-cooling Test

A test piece was prepared by undercoating a plate with a sealer (produced by Kansai Paint Co., Ltd. and marketed under trademark designation of "ALES GUMTILE SEALER") and then further coating the plate with the same facing grade coating agent as mentioned above and a sample of the coating material. The coated plate was subjected to an alternate heating-cooling test specified by JIS A 6910 using 15 cycles each comprising <a 18 hours' immersion in water—a 3 hours' cooling in a constant temperature bath at −20° C., and 5 hours' heating in a constant temperature bath at 50° C.>. After this test, the surface of the applied film on the plate was visually examined and rated for the quality of surface on a five-point scale, wherein ⊚: Perfect absence of abnormal applied film ○: Partial blister in the coated face Δ: Blister on the whole applied film ×: Visually discernible crack in the applied film (6) Workability in Coating A sample of the coating material was adjusted to viscosity of 68–70 KU by dilution with tap water. This sample was applied to a degreased tin plate, 300×450×0.8 mm, with a medium-hair roller brush specified by JIS S 9024 at a rate of 115–125 g/M². The coated plate, fresh from the application of the coating material, was set upright. It was dried at room temperature for 16–24 hours, with the coated surface visually examined and rated regarding the phenomenon of sagging and the quality of skin of the applied film, respectively on the fourpoint scales shown below and in Table 4.

(Sagging property)

⊚: Total absence of discernible sag

○: Slightly discernible sag

Δ: Clearly discernible sag apparent at a distance of 5 m.

×: Conspicuous sag on the entire surface, with the applied film showing a very large difference in film thickness in the upper part and the lower part of the applied film.

(Skin)

⊚: Perfect skin and gloss

○: Perfect gloss despite discernible roller mark

Δ: Poor gloss despite absence of discernible roller mark

×: Too heavy sag to be rated

TABLE 4

|  | Example | | | | | | | | Comparative Example | |
| --- | --- | --- | --- | --- | --- | --- | --- | --- | --- | --- |
|  | 11 | 12 | 13 | 14 | 15 | 16 | 17 | 18 | 3 | 4 |
| Kind of coating material Test item | B-1 | B-2 | B-3 | B-4 | B-5 | B-6 | B-7 | B-8 | B-9 | B-10 |
| Resistance to water (1) | ⊚ | ⊚ | ⊚ | ○ | ⊚ | ⊚ | ⊚ | ○ | ○ | ○ |
| Resistance to water (2) | ○ | ○ | ○ | ○ | ○ | ○ | ○ | ○ | ○ | ○ |

TABLE 4-continued

|  | Example | | | | | | | | Comparative Example | |
|---|---|---|---|---|---|---|---|---|---|---|
|  | 11 | 12 | 13 | 14 | 15 | 16 | 17 | 18 | 3 | 4 |
| Ratio of gloss retention(%) | 77 | 75 | 77 | 71 | 73 | 75 | 78 | 72 | 76 | 74 |
| Tukon hardness | 3.8 | 3.4 | 3.7 | 3.1 | 3.9 | 3.2 | 3.5 | 3.5 | 4.0 | 3.2 |
| Elongation (%) (20° C.) | 244 | 276 | 238 | 288 | 252 | 220 | 236 | 241 | 187 | 65 |
| Elongation (%) (−10° C.) | 25 | 22 | 24 | 19 | 27 | 20 | 25 | 15 | 3 | 1 |
| Alternate heating-cooling test Workability in coating | ⊚ | ⊚ | ⊚ | ⊚ | ⊚ | ⊚ | ⊚ | ○ | ⊚ | ⊚ |
| Sagging | ⊚ | ⊚ | ○ | ○ | ⊚ | ⊚ | ⊚ | ⊚ | ⊚ | X |
| Skin | ⊚ | ⊚ | ○ | ⊚ | ⊚ | ○ | ⊚ | ○ | ○ | X |

Methods of the present invention produce aqueous emulsified polymer dispersions such that the emulsion particles in the dispersion have a multilayer construction and at least one of the multiple layers of the construction forms a urethane graft copolymer layer. The aqueous emulsified polymer dispersion so produced possesses a high solids content for an emulsion as a whole in spite of the inclusion of a urethane component. When it is used as a vehicle component for an air drying water paint, the produced water paint proves to be useful because it manifests substantially perfect workability in coating. Further, a water-based paint using the emulsified polymer as a vehicle component thereof can form an applied film which generally manifests both the low-temperature physical properties of urethane and the merits, weatherability and hardness, inherent in acrylic resins. Resins prepared using the instant emulsified polymer are typically useful for coating the inner and outer faces of buildings, bridges, ships, and vehicles.

The Priority Document, Japanese Patent Application JP 9-113284, filed Mar. 27, 1997, is incorporated herein in its entirety by reference including the specification, abstract, title and claims.

All documents referred to herein are also incorporated by reference in their entireties.

As used in the following claims, articles such as "the", "a", "an", and the like, are intended to denote the singular or the plural of the object that follows. Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An aqueous emulsified polymer dispersion comprising emulsion particles having a multilayer construction, wherein the external layer of the multiple layers of the construction forms a urethane graft copolymer layer from an unsaturated polyurethane obtained by the reaction of (a) a diisocyanate compound, (b) a polyol, (c) a carboxyl group-containing diol, and (d) a hydroxyl group-containing α, β ethylenically unsaturated monomer.

2. An emulsified polymer produced by a multiple stage emulsion polymerization of a polymerizable unsaturated monomer in the presence of water and an emulsifier, wherein the final stage of said multiple stages employs an unsaturated polyurethane resin obtained by the reaction of (a) a diisocyanate compound, (b) a polyol, (c) a carboxyl group-containing diol, and (d) a hydroxyl group-containing α, β ethylenically unsaturated monomer.

3. An emulsified polymer as claimed in claim 2, wherein said unsaturated polyurethane resin acts as a macromolecular emulsifier during the polymerization.

4. A method for producing an emulsified polymer by the multiple stage emulsion polymerization of a polymerizing unsaturated monomer in the presence of water and an emulsifier, said method comprising:

carrying out the final stage of said multiple stages using as a macromolecular emulsifier an unsaturated polyurethane resin obtained by the reaction of (a) a diisocyanate compound, (b) a polyol, (c) a carboxyl group-containing diol, and (d) a hydroxyl group-containing α, β ethylenically unsaturated monomer.

5. A method according to claim 4, wherein said (b) polyol is a polyol having a number average molecular weight in the range of 62–10,000.

6. A method according to claim 4, wherein said unsaturated polyurethane resin is a polyurethane resin obtained by the reaction of an isocyanate group with a hydroxyl group at a weight ratio isocyanate to hydroxy group being in the range of 1:1–1:3.

7. A method according to claim 4, wherein (d) is present at a ratio in the range of 0.01–1 equivalent weight to one equivalent weight of isocyanate group of the polyurethane.

8. A method according to claim 4, wherein said unsaturated polyurethane resin has an acid number in the range of 10–200 per g of the polyurethane resin solids.

9. A method according to claim 4, wherein said polymerizable unsaturated monomer is a monomer having a (meth) acrylic monomer as a main component thereof.

10. A method according to claim 4, wherein said unsaturated polyurethane resin is obtained by the reaction of said (a), (b), (c), and (d) components in an organic solvent exhibiting no activity to an isocyanate group and has high affinity for water.

11. A method according to claim 4, wherein said unsaturated polyurethane resin is incorporated in the emulsified polymer in an amount in the range of 0.1–50% by weight, based on the amount of total solids in said emulsified polymer.

12. A water-based paint grade resin composition comprising: (i) an emulsified polymer produced by a method as claimed in claim 4, and (ii) a hydrazine derivative that contains at least two hydrazide groups or semicarbazide groups that serve as cross-linking agents.

13. A water-based paint grade resin as claimed in claim 12, wherein said component (i) is produced from a carbonyl group containing at least one unsaturated monomer, and wherein said cross-linking agents are provided in respective amounts such that said hydrazide groups or semicarbazide groups in said component (ii) account for a ratio in the range of 0.01:2 mols per mol of carbonyl groups contained in said component (i).

14. A water-based paint grade resin composition according to claim 13, wherein said carbonyl group-containing unsaturated monomer is present in an amount in the range of 0.1–30% by weight based on the weight of all the monomers employed in preparing said emulsified polymer.

15. A water-based paint grade resin composition according to claim 13, wherein said carbonyl group-containing unsaturated monomer is present in an amount in the range of 1–50% by weight based on the weight of all the monomers used in preparing said emulsified polymer.

* * * * *